(12) United States Patent
Warashina

(10) Patent No.: US 10,675,710 B2
(45) Date of Patent: Jun. 9, 2020

(54) MACHINE TOOL

(71) Applicant: MAKINO MILLING MACHINE CO., LTD., Tokyo (JP)

(72) Inventor: Hiroaki Warashina, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 0 days.

(21) Appl. No.: 15/577,937

(22) PCT Filed: May 29, 2015

(86) PCT No.: PCT/JP2015/065649
§ 371 (c)(1),
(2) Date: Nov. 29, 2017

(87) PCT Pub. No.: WO2016/194071
PCT Pub. Date: Dec. 8, 2016

(65) Prior Publication Data
US 2018/0161930 A1     Jun. 14, 2018

(51) Int. Cl.
*B23K 26/146* (2014.01)
*B23K 26/70* (2014.01)
*F16L 55/04* (2006.01)

(52) U.S. Cl.
CPC .......... *B23K 26/146* (2015.10); *B23K 26/702* (2015.10); *F16L 55/04* (2013.01)

(58) Field of Classification Search
CPC ............... B23K 26/14; B23K 26/1436; B23K 26/1462; B23K 26/1488; F16L 55/04; F16L 55/043; F16L 55/045
USPC ........................ 219/121.84; 138/118, 129, 26
See application file for complete search history.

(56) References Cited

U.S. PATENT DOCUMENTS

| | | | | |
|---|---|---|---|---|
| 3,780,208 | A | * 12/1973 | Whittaker | ............. F16L 11/127 174/47 |
| 4,561,251 | A | * 12/1985 | Moret | ..................... F03B 13/00 138/118 |
| 2004/0228741 | A1 | 11/2004 | Kim et al. | |
| 2008/0191390 | A1* | 8/2008 | Fukushima | ........... B23P 15/243 264/400 |
| 2010/0108648 | A1* | 5/2010 | Koseki | ............... B23K 26/0604 219/121.67 |

FOREIGN PATENT DOCUMENTS

| | | |
|---|---|---|
| JP | 54-148665 | 10/1979 |
| JP | 63-96392 | 4/1988 |
| JP | 10-75956 | 3/1998 |
| JP | 2004-340134 | 12/2004 |
| JP | 2007-98418 | 4/2007 |

OTHER PUBLICATIONS

Japanese to English machine translation of JP 2007-098418.*

* cited by examiner

*Primary Examiner* — Michael G Hoang
(74) *Attorney, Agent, or Firm* — Morrison & Foerster LLP

(57) ABSTRACT

This machine tool is provided with: a pump which pressurizes a liquid; a nozzle which ejects the liquid pressurized by the pump toward a workpiece; and a pulsation removing pipe which is provided between a discharge port of the pump and the nozzle and which is formed by being wound a plurality of turns or by being bent zigzagged a plurality of times, wherein the workpiece is processed while the pressurized liquid is ejected.

3 Claims, 2 Drawing Sheets

MACHINE TOOL

CROSS-REFERENCE TO RELATED APPLICATION

This application is a U.S. national phase patent application of International Patent Application No. PCT/JP2015/065649, filed May 29, 2015, the contents of which is hereby incorporated by reference in the present disclosure in its entirety.

FIELD OF THE INVENTION

The present invention relates to a machine tool that performs machining, while ejecting a pressurized liquid toward a workpiece, and reduces the pressure pulsations in the liquid.

BACKGROUND OF THE INVENTION

Patent Literature 1 describes a hybrid laser processing method, comprising a pump that pumps a high-pressure liquid, an accumulator for storing the liquid transferred from the pump and for discharging the stored liquid, and a processing head for forming the liquid into a columnar shape and spraying the liquid toward a workpiece, as well as for irradiating the workpiece with laser light having passed through the columnar liquid, wherein the processing head and the workpiece are moved relative to each other so as to perform the required processing on the workpiece.

PATENT DOCUMENTS

Patent Literature 1: JP-A-2007-098418

BRIEF SUMMARY OF THE INVENTION

However, since extremely high-pressure water is supplied to the laser processing machine as described in Patent Document 1, the gas pressure of the accumulator is also high. Thus, for example, when transporting the laser processing machine from the manufacturing facility to a factory of the user by aircraft, it is necessary to remove the high-pressure gas from the accumulator prior to transportation and after the laser processing machine is installed in the factory of the user, it is necessary to refill the accumulator with high-pressure gas. Therefore, an increase in the cost is required for installation of the laser processing machine.

The technical task of the present invention is to solve such problems of the prior art, and an object of the present invention is to provide a machine tool for performing processing while ejecting a pressurized liquid toward a workpiece, wherein pressure pulsations of the pressurized liquid ejected toward the workpiece are reduced or eliminated without the use of a pressurized gas such as from an accumulator.

In order to achieve the above object, according to the present invention, a machine tool for processing a workpiece while ejecting a pressurized liquid, comprising a pump configured to pressurize the liquid, a nozzle configured to eject the liquid pressurized by the pump toward the workpiece, and a pulsation removing pipe provided between a discharge port of the pump and the nozzle, the pulsation removing pipe is formed with a pile wound a plurality of turns or bent zigzagged a plurality of times is provided.

According to the present invention, a pulsation removing pipe is provided between the pump and the nozzle. By increasing the length of the pipe from the pump to the nozzle, and by increasing the volume of the pipe from the pump to the nozzle, pressure pulsations of the liquid supplied to the nozzle are reduced or eliminated.

DETAILED DESCRIPTION OF THE INVENTION

Figure 1:
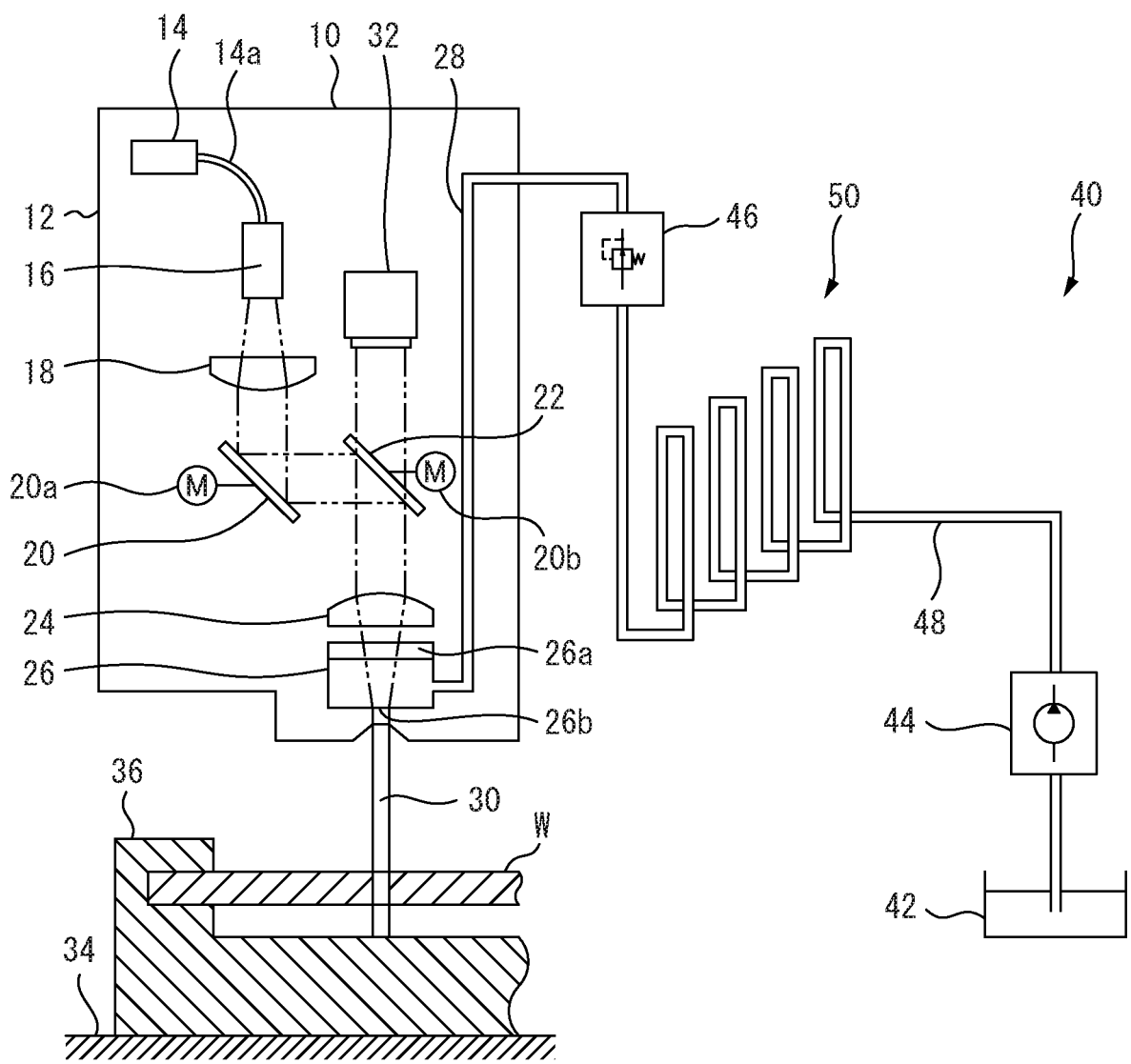
FIG. 1 is a schematic cross-sectional view of an optical head of a laser processing machine as an example of a machine tool to which the present invention is applied.

FIG. 1 shows an optical head of a laser processing machine as an example of a machine tool to which the present invention is applicable. In FIG. 1, an optical head 10 includes a laser irradiation head 16 which is arranged in a housing 12, receives laser light from a laser oscillator 14 via a light guide member 14a, such as an optical fiber, and which irradiates the light onto a collimation lens 18. The laser light from the laser irradiation head 16 is collimated by the collimation lens 18, and is reflected by a first mirror 20 toward a second mirror 22, and is reflected by the second mirror 22 toward a focus lens 24. The laser light focused by the focus lens 24 is irradiated to the outside of the housing 12 through the nozzle head 26. Here, the optical axis of the laser beam irradiated by the optical head 10 is substantially parallel to the Z-axis.

The first and second mirrors 20, 22 have planar reflecting surfaces, and have motors 20a, 22a as mirror orientation adjusting means for adjusting the directions of the reflecting surfaces (the directions perpendicular to the reflecting surfaces) and adjusting the direction of the laser beam irradiated from the optical head 10. Furthermore, the first and second mirrors 20, 22, in particular the second mirror 22 which reflects the laser light toward the focus lens 24, include a dielectric multilayer film which is adapted to the wavelength of the laser light emitted from the laser oscillator 14, reflects the laser light of the adaptable wavelength, and allows light of wavelengths other than the adaptable wavelength to be transmitted therethrough. More specifically, such dielectric multilayer film is formed by vapor deposition on a glass plate. By forming the second mirror 22 from the dielectric multilayer film, it is possible to monitor the positional relationship between the laser beam irradiated from the nozzle 26b and the nozzle 26b using the camera 32.

The nozzle head 26 is a hollow member that receives a supply of water from a water supply device 40 via a supply line 28. A nozzle 26b for ejecting a water jet is provided on the bottom wall of the nozzle head 26 facing the table 36, and a window 26a, which is made of a transparent member such as glass, is provided on the upper surface of the nozzle head 26 facing the focus lens 24 on the opposite side of the bottom wall. The nozzle 26b is communicable with the outside of the housing 12 through an aperture formed in the bottom surface of the housing 12 of the optical head 10. A table 34 of the laser processing machine is arranged on the underside of the housing 12, and a workpiece W is fixed to the table 34 via a fixture 36 so as to face the nozzle 26b.

Figure 2:
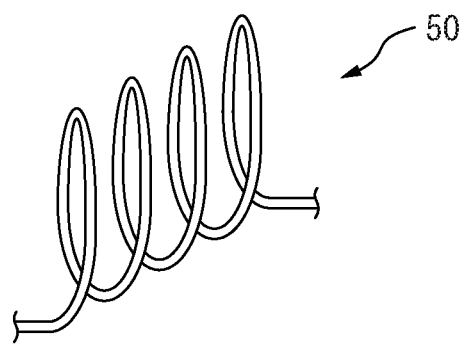
FIG. 2 is a schematic view showing the pulsation removing pipe in a form which is spirally wound a plurality of turns.
Figure 3:
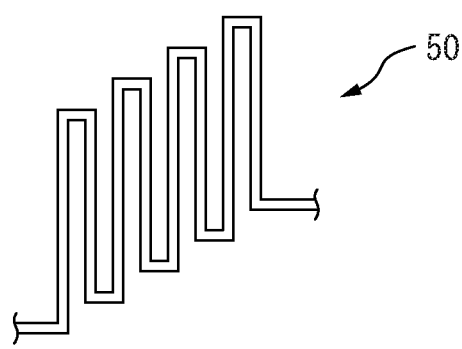
FIG. 3 is a schematic view showing the pulsation removing pipe in a form in which straight pipe portions and bent pipe portions are alternately and repeatedly arranged.
Figure 4:
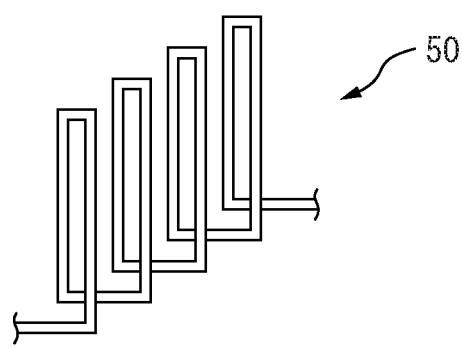
FIG. 4 is a schematic view showing the pulsation removing pipe in a form in which straight pipe portions and bent pipe portions are alternately and repeatedly wound a plurality of turns.

The water supply device 40 is equipped with a tank 42 for storing liquids, in particular water, a pump 44 for pressurizing the water of the tank 42 and supplying the water to the optical head 10, a pressure regulating valve 46 provided in the supply line 28, and a pulsation removing pipe 50 provided in the discharge line 48 of the pump 44. The pulsation removing pipe 50 can be, for example, in the form of a spiral wound a plurality of times, as shown in FIG. 2, in the form consisting of straight pipe portions and bent pipe portions alternately and repeatedly arranged, as shown in FIG. 3, or in the form consisting of straight pipe portions and bent pipe portions alternately and repeatedly wound a plurality of times, as shown in FIG. 4. Furthermore, the pulsation removing pipe 50 may be formed by an elastically deformable hose.

Thus, the liquid stored in the tank 42 is pressurized by the pump 44, sent to the pressure regulating valve 46 via the discharge line 48 and the pulsation removing pipe 50, and after the pressure thereof is reduced to a predetermined pressure required by the laser processing by the pressure regulating valve 46, the liquid is ejected from the nozzle 26a of the nozzle head 26 in the shape of a water column 30 toward the workpiece W via the supply line 28.

In the laser processing machine, in general, it is necessary to stably eject a water column 30 having a diameter of 1 mm or less toward the workpiece W. Thus, the liquid to be supplied to the nozzle head 26 must be pressurized to a high pressure, such as, for example, 100 MPa, and a high-pressure pump, such as a double-headed piston pump, is used as the pump 44. As a result, the pressure of the liquid discharged from the pump 44 fluctuates or pulsates in synch with the operation of the pistons. When the pressure of the liquid supplied to the optical head 10 of the laser processing machine pulsates, a stable water column 30 cannot be formed, and the laser beam irradiated toward the workpiece W through the water column 30 is also unstable.

In the present invention, the pulsation removing pipe 50 is disposed between the pump 44 and the nozzle 26b, more preferably, between the pump 44 and the pressure regulating valve 46, so that the length of the line from the pump 44 to the nozzle 26b is lengthened and the volume of the line from the pump 44 to the nozzle 26b is increases, whereby pressure pulsations in the liquid supplied to the nozzle 26b are eliminated. Furthermore, by forming the pulsation removing pipe 50 from a high-pressure elastic hose, the pulsation removing effect can be further enhanced.

REFERENCE SIGNS LIST 10 optical head
26 nozzle head
26b nozzle
28 supply line
30 water column
40 water supply device
42 tank
44 pump
46 pressure regulating valve
48 discharge line
50 pulsation removing pipe

The invention claimed is:

1. A machine tool for processing a workpiece while ejecting a pressurized liquid, comprising:
   a pump configured to pressurize the liquid to an initial pressure;
   a pressure regulating valve configured to reduce the initial pressure of the liquid flowing therethrough to a predetermined pressure that is lower than the initial pressure;
   a nozzle configured to eject the liquid having the predetermined pressure, in a form of a water column having a diameter of 1 mm or smaller, toward the workpiece; and
   a pulsation removing pipe provided between a discharge port of the pump and the pressure regulating valve, the pulsation removing pipe being formed with a pile wound a plurality of turns or bent zigzagged a plurality of times,
   wherein the pressure regulating valve regulates the liquid to the predetermined pressure during the processing of the workpiece.

2. The machine tool according to claim 1, wherein the machine tool is a laser processing machine and the nozzle ejects the liquid along an optical axis of a laser beam.

3. The machine tool according to claim 1, wherein the pulsation removing pipe is formed by an elastically deformable hose.

* * * * *